(12) United States Patent
Magistrado et al.

(10) Patent No.: US 10,104,023 B2
(45) Date of Patent: Oct. 16, 2018

(54) LOCATION SHARING

(71) Applicant: Yahoo!, Inc., Sunnyvale, CA (US)

(72) Inventors: Vince Magistrado, Redlands, CA (US); Sneha Datla, Sunnyvale, CA (US)

(73) Assignee: OATH INC., New York, NY (US)

( * ) Notice: Subject to any disclaimer, the term of this patent is extended or adjusted under 35 U.S.C. 154(b) by 189 days.

(21) Appl. No.: 14/688,267

(22) Filed: Apr. 16, 2015

(65) Prior Publication Data
US 2016/0308798 A1    Oct. 20, 2016

(51) Int. Cl.
*G06F 3/0484* (2013.01)
*H04L 12/58* (2006.01)

(52) U.S. Cl.
CPC ........ *H04L 51/046* (2013.01); *G06F 3/04842* (2013.01); *H04L 51/20* (2013.01); *H04L 51/38* (2013.01); *H04L 51/04* (2013.01)

(58) Field of Classification Search
CPC ... G06F 3/04842; H04L 51/04; H04L 51/046; H04L 51/20; H04L 51/38
See application file for complete search history.

(56) References Cited

U.S. PATENT DOCUMENTS

| | | | | |
|---|---|---|---|---|
| 6,621,532 B1* | 9/2003 | Mandt | ................... | G06F 3/0482 348/841 |
| 8,566,029 B1* | 10/2013 | Lopatenko | ........... | G08G 1/0962 701/400 |
| 2002/0194246 A1* | 12/2002 | Moskowitz | .......... | G06Q 10/109 718/102 |
| 2004/0064355 A1* | 4/2004 | Dorenbosch | ....... | G06Q 10/1095 705/7.19 |
| 2005/0073407 A1* | 4/2005 | Giraldin | ................ | G06Q 10/02 340/539.2 |
| 2006/0041663 A1* | 2/2006 | Brown | .................. | H04L 67/306 709/226 |
| 2006/0242234 A1* | 10/2006 | Counts | .................... | H04W 4/08 709/204 |
| 2007/0281716 A1* | 12/2007 | Altman | ............... | H04L 12/5865 455/466 |
| 2008/0147319 A1* | 6/2008 | Cubillo | .................. | G06Q 30/02 701/431 |
| 2009/0040370 A1* | 2/2009 | Varanasi | ................ | G01C 21/20 348/376 |
| 2009/0112461 A1* | 4/2009 | Murphy | ................. | G01C 21/20 701/532 |
| 2009/0177745 A1* | 7/2009 | Davis | ................... | G06Q 10/107 709/204 |
| 2009/0217192 A1* | 8/2009 | Dean | ..................... | G06F 3/0481 715/777 |

(Continued)

*Primary Examiner* — Eric J Bycer
(74) *Attorney, Agent, or Firm* — Cooper Legal Group, LLC

(57) ABSTRACT

Many users may plan meetings through social networks, email, and/or websites. As provided herein, a user may efficiently plan a meeting with other users through a map interface. For example, the user may identify a location of interest on a map, and choose one or more target users to receive an automatically generated location of interest message about meeting at the location of interest. The location of interest message may comprise text describing the location of interest (e.g., I am at the back table at the Steak Grill, I am near the library sign on the corner of West St. and East St., etc.), directions to an event at the location of interest, instructions about the event, a location of the event, a time of the event, etc.

20 Claims, 15 Drawing Sheets

(56) References Cited

U.S. PATENT DOCUMENTS

| | | | |
|---|---|---|---|
| 2010/0106403 A1* | 4/2010 | Elliott | G01C 21/32 700/201 |
| 2010/0125407 A1* | 5/2010 | Cho | G01C 21/3602 701/533 |
| 2010/0157848 A1* | 6/2010 | Das | H04W 4/043 370/254 |
| 2010/0299065 A1* | 11/2010 | Mays | G01C 21/20 701/533 |
| 2011/0041084 A1* | 2/2011 | Karam | G06Q 10/10 715/753 |
| 2011/0080848 A1* | 4/2011 | Khorashadi | G01C 21/20 370/254 |
| 2011/0130956 A1* | 6/2011 | Tracton | G01C 21/3644 701/533 |
| 2011/0191019 A1* | 8/2011 | Holsinger | G01C 21/00 701/533 |
| 2011/0289433 A1* | 11/2011 | Whalin | G06F 17/30964 715/753 |
| 2011/0313653 A1* | 12/2011 | Lindner | G01C 21/3632 701/523 |
| 2012/0166074 A1* | 6/2012 | Weng | G01C 21/32 701/409 |
| 2012/0306922 A1* | 12/2012 | Kadous | G01C 21/20 345/634 |
| 2013/0035110 A1* | 2/2013 | Sridhara | H04W 4/021 455/456.1 |
| 2013/0166197 A1* | 6/2013 | Tseng | G01C 21/3644 701/426 |
| 2013/0252591 A1* | 9/2013 | Sasaki | H04W 4/001 455/414.1 |
| 2013/0260790 A1* | 10/2013 | Itzhaki | H04W 4/02 455/456.1 |
| 2013/0339478 A1* | 12/2013 | Edge | H04L 67/16 709/217 |
| 2014/0005921 A1* | 1/2014 | Voronel | G01C 21/34 701/423 |
| 2014/0053077 A1* | 2/2014 | Unnikrishnan | G06F 3/04815 715/747 |
| 2014/0188541 A1* | 7/2014 | Goldsmith | G06Q 10/06 705/7.19 |
| 2014/0244332 A1* | 8/2014 | Mermelstein | G06Q 10/1093 705/7.16 |
| 2014/0253582 A1* | 9/2014 | Chen | G09G 5/30 345/594 |
| 2015/0112593 A1* | 4/2015 | Kandangath | G01C 21/3644 701/541 |

* cited by examiner

LOCATION SHARING

BACKGROUND

Many users may plan to meet through phone calls, text messages, social network posts etc. For example, Dan may send a text message to Sue about meeting for coffee in a few hours near a bus station. Dan and Sue may engage in back and forth text messages in order to identify a particular coffee shop at which to meet. Sue may perform an internet search of the coffee shop in order to identify an address of the coffee shop. Sue may input the address into a map application on a mobile device in order to route directions to the coffee shop. Unfortunately, Dan and Sue may waste considerable time, effort, and/or computing resources in planning to meet at a particular location. Accordingly, it may be advantageous to provide a way for a user to efficiently share meetup and location sharing information with other users.

SUMMARY

In accordance with the present disclosure, one or more systems and/or methods for location sharing are provided. In an example, a user, of a client device, may be presented with a map of a general location of the user (e.g., a current location of the user). Responsive to receiving a user input on the map from the user, a location of interest corresponding to the user input may be identified (e.g., the current location of the user, a future location of the user that is selected by the user, a favorite location of the user, etc.). A message sharing interface comprising one or more target users may be presented to the user, such as by accessing contact information from the client device, requesting the user to manually input contact information, and/or importing contact information from an external source (e.g., the user may have created a social network group of social network friends that regularly meet for board games, and thus a preexisting target user group may be suggested for selection through the message sharing interface). The user may be presented with an option to create a target user group by selecting a set of target users from the one or more target users to create the target user group (e.g., the user may dynamically define the target user group by selecting or manually inputting target users).

A selection of a target user from the one or more target users may be received through the message sharing interface (e.g., such as a selection of a target user, a manual input of a target user such as a phone number or email address, etc.). A location of interest message (e.g., a SMS message, a text message, a social network message, an email message, etc.) may be presented to the target user and/or the target user group. The location of interest message may be constructed to comprise an event description of an event, instructions about the event, a time of the event, a recommendation corresponding to a condition of the location of interest (e.g., a recommendation to bring an umbrella based upon a possibility of rainy weather), and/or directions to the location of interest. In an example, the location of interest may be constructed to comprise a textual and/or audio message. The message may be automatically generated to describe the user's relationship to the location of interest (e.g., I am between Building D and the Cafeteria).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
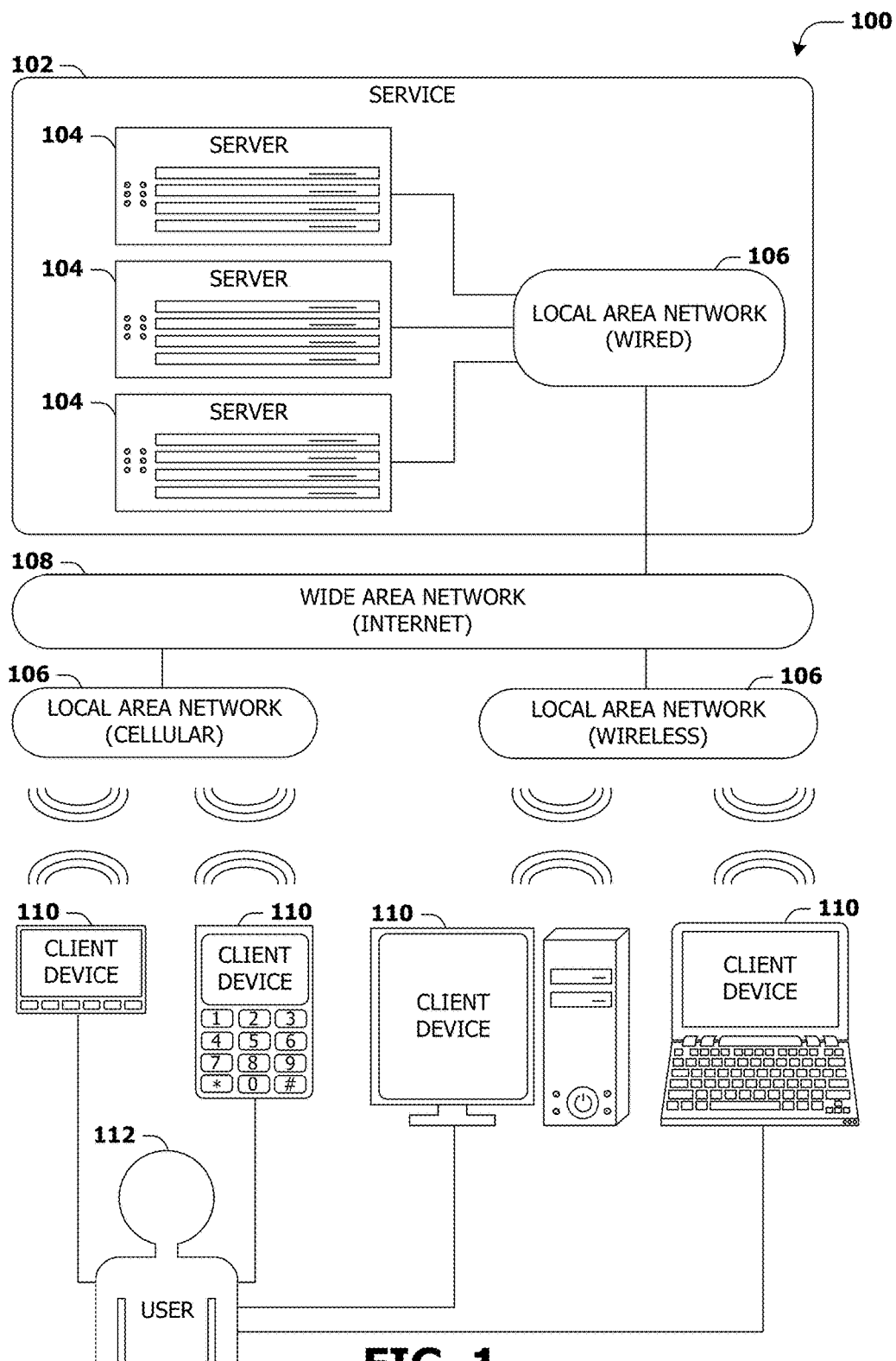
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a BLUETOOTH personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
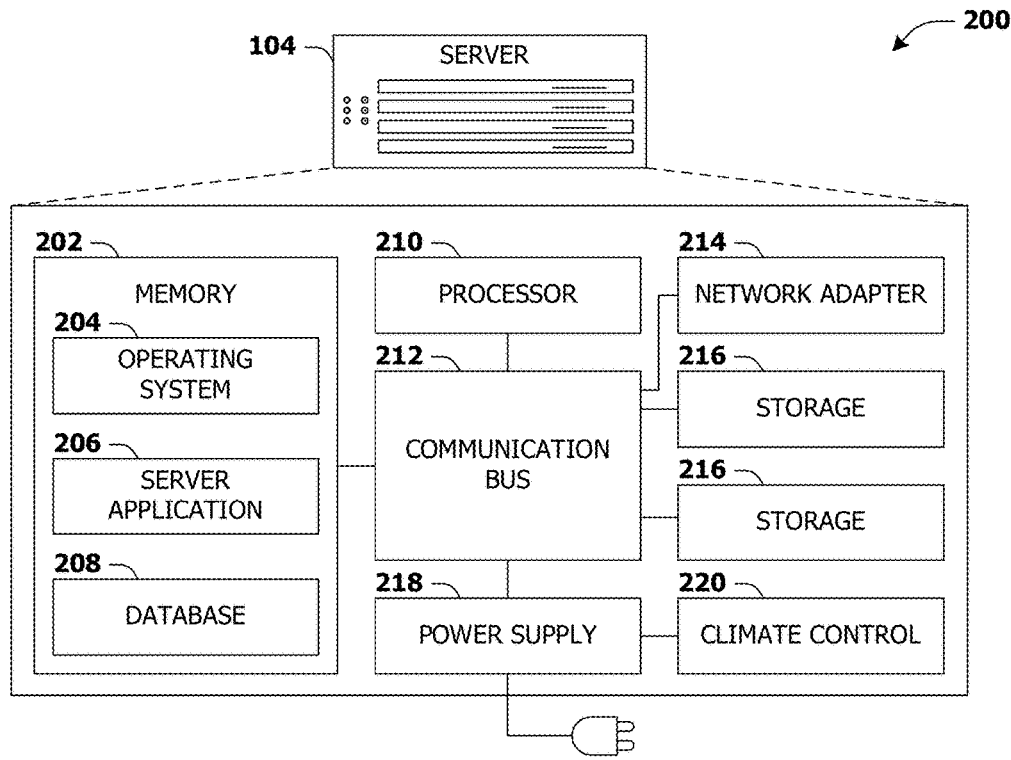
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
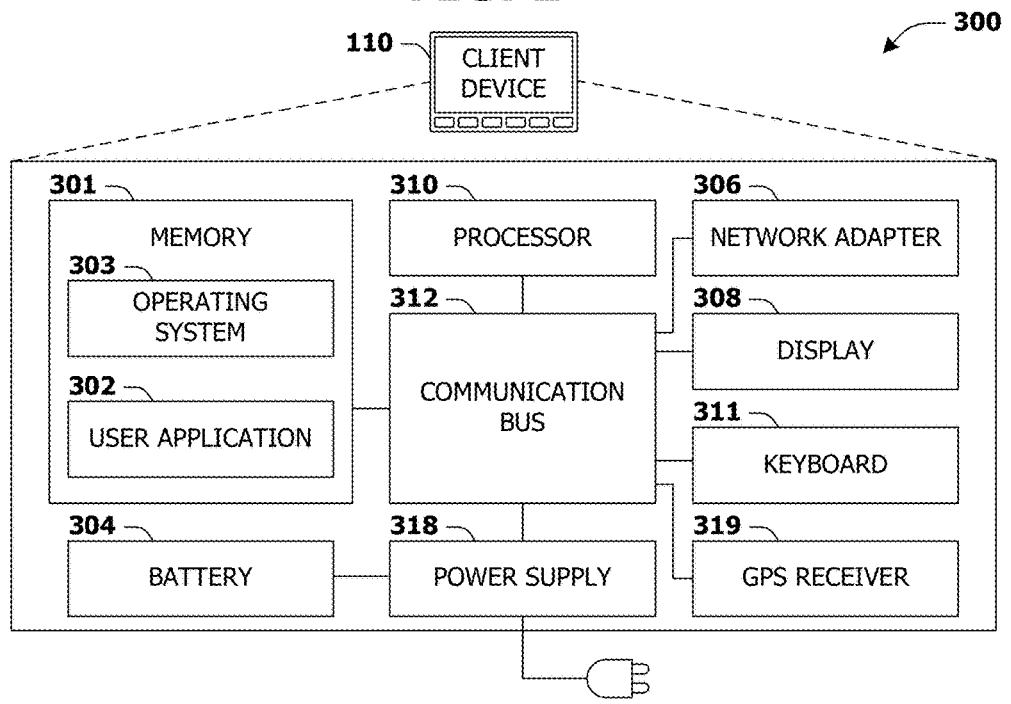
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, a cell phone, smartphone, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Many users may desire an efficient way to plan meetups with other users. Unfortunately, users may waste time and/or computing resources when coordinating through multiple messages, using search engines to identify location addresses, and/or using route planning functionality to obtain directions. Accordingly, as provided herein, users may directly send messages about meeting up through a map interface. For example, a user may select a location of interest on a map (e.g., by merely tapping the location of interest on the map). A message sharing interface may be presented to the user, such that the user may select pre-populated target users and/or manually specified target users as recipients of a message regarding meeting up at the location of interest. The ability to provide users with the message about meeting up at the location of interest may reduce time and/or computing resources otherwise utilized by users in an attempt to plan a meeting at the location of interest (e.g., exchanging messages, identifying addresses, route planning, etc.).

Figure 4A:
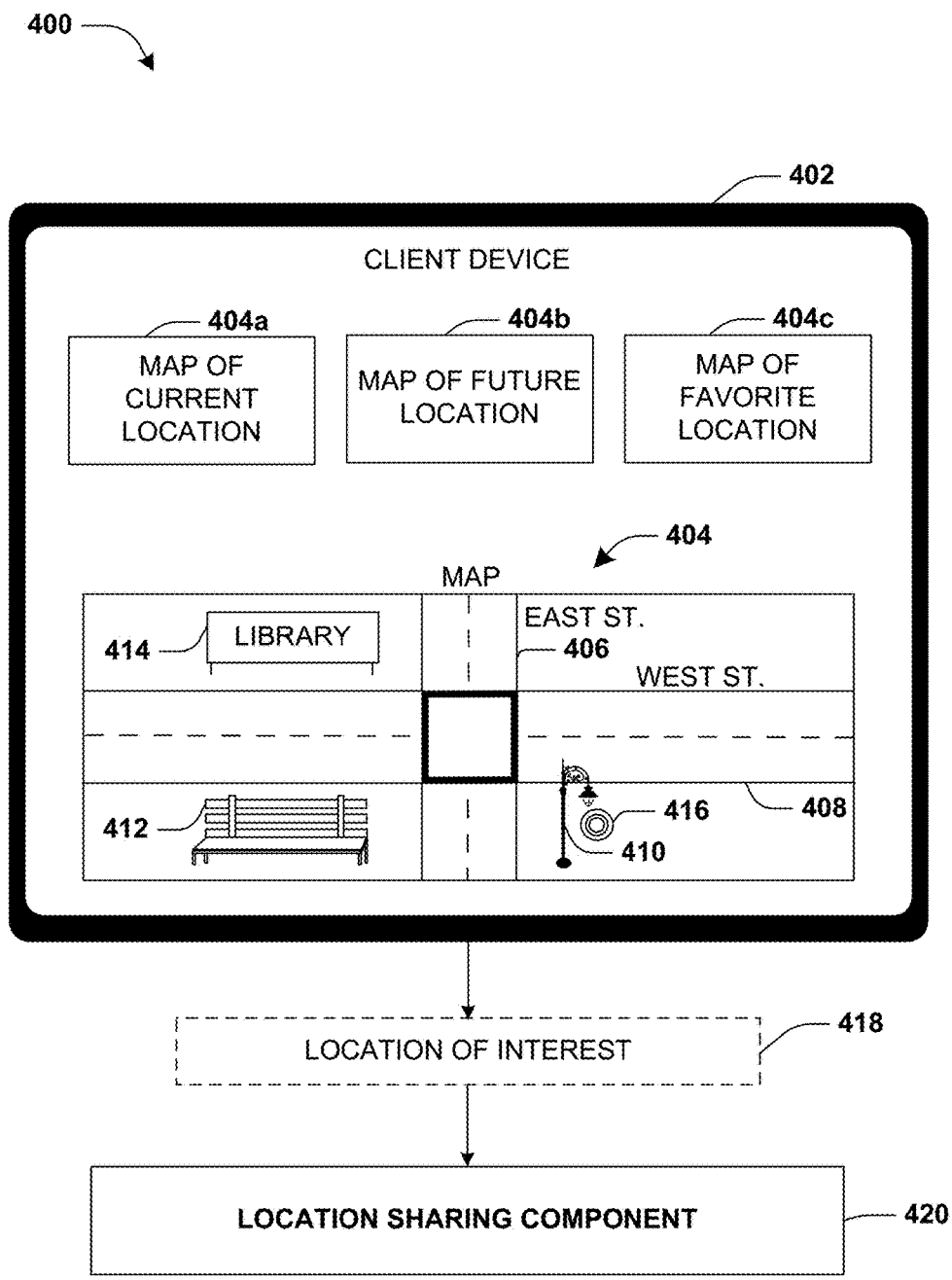
FIG. 4A is a component block diagram illustrating an example system for location sharing, where a location of interest is identified.
Figure 4B:
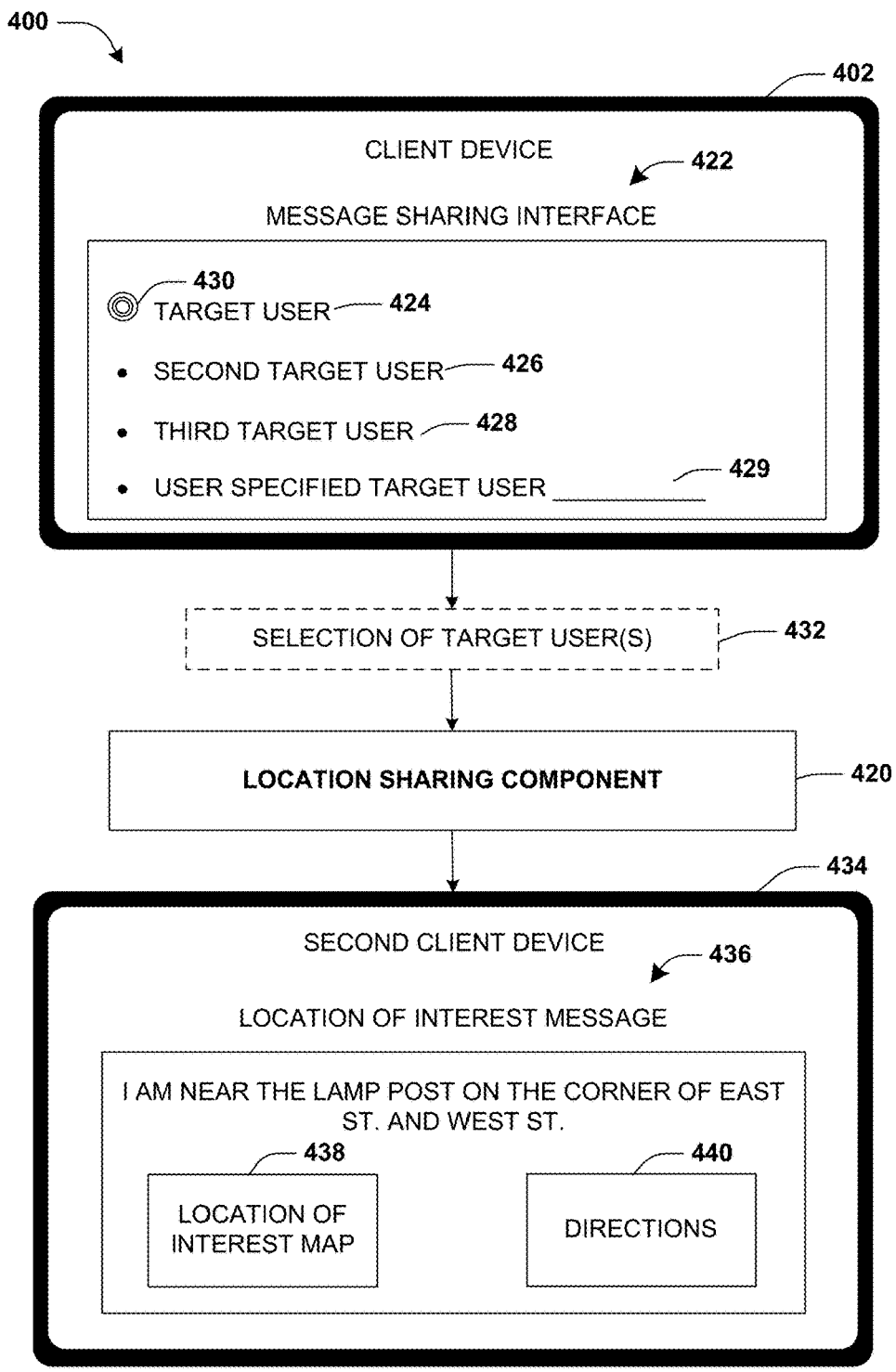
FIG. 4B is a component block diagram illustrating an example system for location sharing, where a location of interest message is provided to a target user.
Figure 4C:
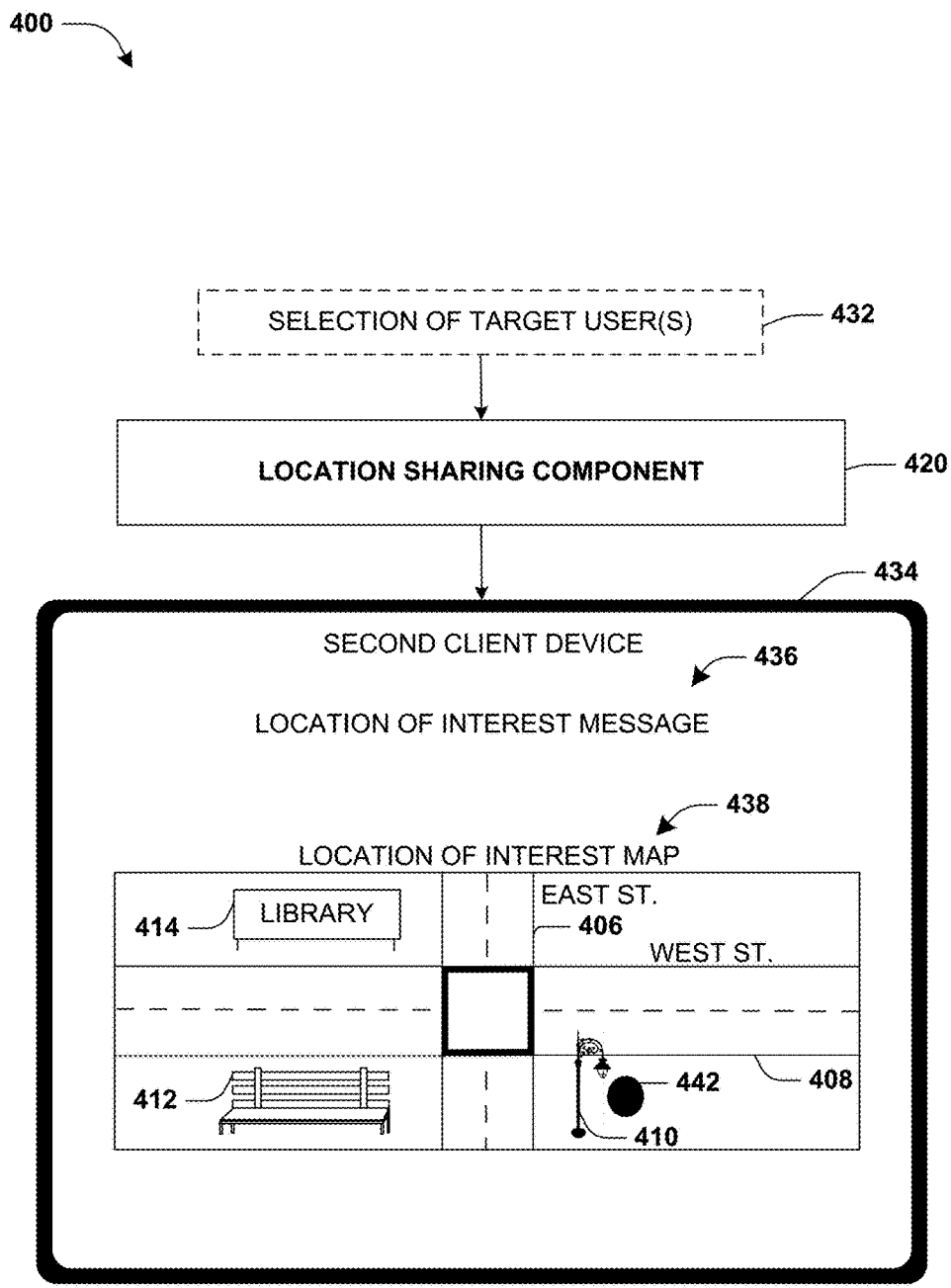
FIG. 4C is a component block diagram illustrating an example system for location sharing, where a location of interest message, comprising a location of interest map, is provided to a target user.

FIGS. 4A-4C illustrate an example of a system 400, comprising a location sharing component 420, for identification of a location of interest 418 to share with a target user 424. For example, a user, of a client device 402, may be presented with one or more options for obtaining a map 404 of a general location. For example, a map of a current location option 404*a* may be used to populate the map 404 based upon a current location of the user. A map of a future location option 404*b* may be used to populate the map 404 based upon a location that the user is planning to visit at a later time, which may be identified based upon the user specifying a future location as the general location or the future location being imported from a calendar, an email, social media invite, a social network post, etc. A map of a favorite location option 404c may be used to populate the map 404 with a location that the user may frequently visit or may have designated as a favorite location. In an example, the map 404 may not be dependent on global positioning systems, triangulation of cellular signals, etc. In an example, the map 404, corresponding to the general location that the user selected, may comprise zones (e.g., a front of a restaurant, a back of the restaurant, a left portion of a train loading area, a right portion of a train loading area, etc.), and/or landmarks, such as a library sign 414, a lamp post 410, a park bench 412, cross streets (e.g., a corner of East St. 406 and West St. 408), etc. In an example, the map 404 may be generated by identifying one or more pictures of a location (e.g., one or more photographs of the corner of East St. 406 and West St. 408) and converting the pictures into the map 404. In an example where the map 404 depicts a library (e.g., corresponding to the library sign 414), the map 404 of the library may depict a library book shelf, a stairwell, a book checkout section, and/or other portions of the library depicted in the one or more pictures.

The user may generate user input 416 by identifying the location of interest 418 on the map 404 (e.g., a mouse click, a touch gesture, etc.). In this way, the location of interest 418 may be determined based upon user interaction with the map 404, as opposed to GPS or other location tracking functionality that may otherwise be imprecise, such as when identifying locations within the library or other indoor structures. In an example, the location of interest 418 may be identified based upon a proximity of the user input 416 to a landmark and/or a zone as depicted on the map 404 (e.g., the lamp post 410). In an example, the user may identify the location of interest 418 without utilizing a keyboard, a speaker, etc., by selecting the location of interest 418 with a single tap (e.g., a single touch). An ability to select the location of interest 418 using the single tap may be beneficial, where, for example, the user is in a loud and/or chaotic situation. Absent the ability, the user may be unable to convey the location of interest 418 by leaving a voice message, audio message, etc., due to the noise. Additionally, the ability may be beneficial, where, for example, the user has a single hand free, due to having bags in one hand, carrying a child, etc. Absent the ability, the user may be unable to convey the location of interest 418 by using the keyboard to type a message describing the location of interest 418, due to the user having merely one hand with which to type. Responsive to the user identifying the location of interest 418, the location of interest 418 may be provided to the location sharing component 420. In an example, the map 404 may correspond to a venue and/or an event, such that a layout of the map 404 may depict an inside of the library, zones at a bus station (e.g., an entrance zone, a first bus loading zone, a second bus loading zone, etc.), etc. In an example, the user may add landmarks, layouts, zones, etc. to the map 404 (e.g., the user may draw a shape around a new zone to define the location of interest 418 for meeting up with other users). In an example, the user may provide feedback as to whether a landmark, layout, or zone is inaccurately depicted so that the location sharing component 420 may correct the inaccuracy and/or define the location of interest 418.

FIG. 4B illustrates the location sharing component 420 providing a location of interest message 436 to a selection of target user(s) 432. The location sharing component 420 may present the user with one or more target users (e.g., the target user 424, a second target user 426, and/or a third target user 428) and/or a user specified target user interface 429 (e.g., the user may specify a phone number, email address, or other communication identification of a target user) through a message sharing interface 422 (e.g., a user interface element that may be displayed with the map 404, such as overlaid on the map or displayed within a sidebar menu). In an example, responsive to the user selecting the target user 424, the selection of target user(s) 432, comprising the target user 424, may be provided to the location sharing component 420. The location sharing component 420 may construct the location of interest message 436 to comprise a message (e.g., I am near the lamp post 410 on the corner of East St. 406 and West St. 408), a location of interest map 438 (e.g., the location of interest map 438 may be similar to the map 404, as illustrated in FIG. 4A), and/or directions 440 to the location of interest (e.g., from a current location of the target user 424). In an example, the message may comprise instructions to meet the user in a specific location (e.g., meet me here), instructions to avoid an area (e.g., avoid the corner of East St. 406 and West St. 408), instructions to bring money (e.g., let's get a hamburger here and bring $10), etc. The message may be manually input by the user, selected from a pre-existing set of messages, may be automatically generated to describe the location of interest 418 (e.g., I am at a back table at Barbecue Grill, I am in the non-fiction section of the Library, etc.), etc. In an example, the message may be automatically generated based upon the proximity of the user input 416 to a landmark and/or a zone as depicted on the map 404, as illustrated in FIG. 4A.

In an example, the user may select one or more locations of interest (e.g., the location of interest 418, a second location of interest, and a third location of interest) from the map 404, as illustrated in FIG. 4A. In an example, the user may be a planner of an event (e.g., a carnival event), and may desire to highlight one or more locations of interest (e.g., a dunk tank, a cotton candy booth, a fun house, etc.). The user may select the location of interest 418, the second location of interest, and the third location of interest to share with the selection of target user(s) 432 (e.g., target users that may attend the carnival event, target users that have subscribed to learn about the carnival event, target users that follow the user on social media, etc.). In an example, the message location of interest 436 may comprise a name, directions, and/or descriptions about each selected location of interest. In an example, where the location of interest 418 is a Ferris wheel, the description might include "don't forget to ride the Ferris wheel" or where the second location of interest is the fun house, the description might include "get a ticket for $2 to enter the fun house." The location of interest map 438 may highlight the selected locations of interests. The selection of target user(s) 432 may select (e.g., click, touch, etc.) one of the locations of interest 418, the second location of interest, and/or the third location of interest to view additional information (e.g., access directions from the current location of the target user 424, hours of operation of the selected location of interest, etc.).

In an example, the user may update the location of interest message 436 at a scheduled time. For example, the user may receive a reminder at or near a meeting time to confirm or alter the location of interest and/or the meeting time (e.g., based upon the user running late, having altered the location of interest, etc.) In another example, the user may update the location of interest at any time (e.g., such as where the user has altered the location of interest, has altered the meeting time, is cancelling an event at the location of interest, etc.), and the update may be broadcasted to other target users.

FIG. 4C illustrates the location sharing component 420 providing the location of interest message 436, comprising the location of interest map 438, to the selection of target user(s) 432. The location of interest may be denoted by a user interface element such as a spot 442, a beacon, an image (e.g., a predefine icon, a photo captured by the user, etc.), a user interface element corresponding to an ability to play an audio message, or any other information (e.g. specified by the user or selected from pre-defined information). In an example, a custom image may relate to the location of interest. For example, if the location of interest comprises the hamburger restaurant, then the custom image may comprise a hamburger icon. If the location of interest comprises a bonfire, then the custom image may comprise a fire icon, etc. In this way, the location of interest message 436 may comprise user specified or predefined textual messages, audio messages, video messages (e.g., the user may capture a video of the user talking about instructions on meeting up), imagery (e.g., a snapshot of a location captured by a camera of the user), the location of interest map 438, and/or any other information. Thus, the user may efficiently convey meeting information to the target user 424 through the map 404 and/or message sharing interface 422, which may mitigate unnecessary text messages, emails, address lookups, direction routing, and/or wandering around trying to find a meetup location.

Figure 5A:
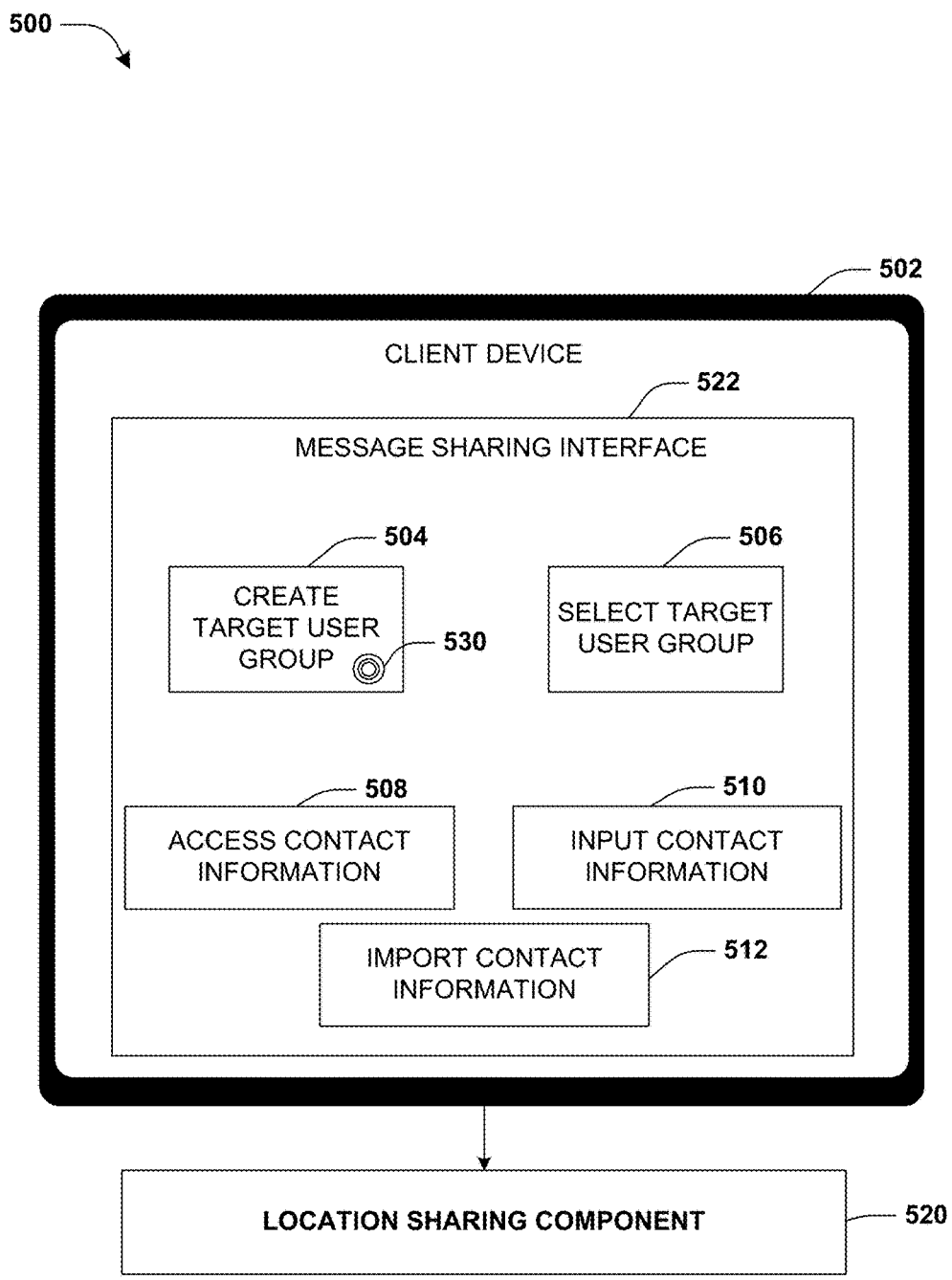
FIG. 5A is a component block diagram illustrating an example system for location sharing, where a target user group is created.
Figure 5B:
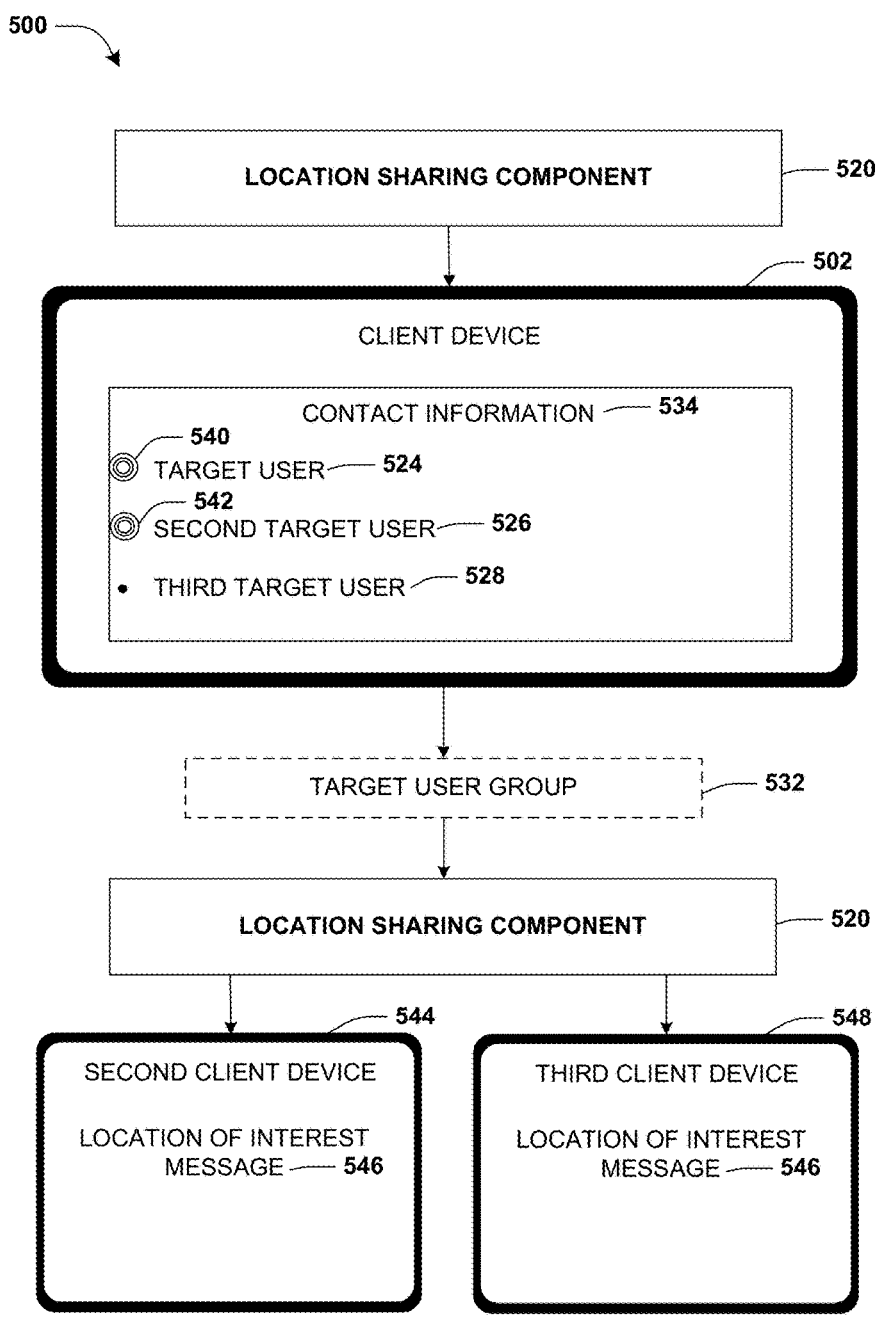
FIG. 5B is a component block diagram illustrating an example system for location sharing, where a location of interest message is provided to a target user group.

FIGS. 5A-5B illustrate an example of a system 500, comprising a location sharing component 520 generating a message sharing interface 522 for creating a target user group 532. A user, of a client device 502, may utilize the message sharing interface 522 to send a location of interest message 546, corresponding to a location of interest identified on a map (not illustrated) by the user, to the target user group 532. The user may be presented with a create target user group option 504 and/or a select target user group option 506. In an example, the user may select the select target group option 506 in order to select a preexisting target user groups to whom the location of interest message 546 may be provided. In another example, if the user selects 530 the create target group option 504, then the user may be presented with an access contact information option 508 (e.g., such as contact information stored on the client device 502), an input contact information option 510 (e.g., the user may manually input a phone number, an email address, a social media account name, etc. such as input into a manual input interface), and/or an import contact information option 512 (e.g., to retrieve contact information from a social network, an email contact list, a remote server, etc.).

FIG. 5B illustrates the user selecting one or more target users to create the target user group 532. For example, the user may select one or more target users from contact information 534 (e.g., obtained using the access contact information option 508) to create the target user group 532. In an example, the user may make a first selection 540 of a target user 524 and a second selection 542 of a second target user 526 to create the target user group 532. The target user group 532 may be provided to the location sharing component 520. The location sharing component 520 may provide the location of interest message 546 to the target user group 532, such as to the target user 524 on a second client device 544 and the second target user 526 on a third client device 548. In an example, the target user 524 and/or the second target user 536 may respond to the location of interest message 546 with a second location of interest message (not shown). The second location of interest message may comprise a response by the target user 524 (e.g., an audio message about running late, a textual message of a question about what food to bring, imagery such as a photo of a target user 524 carrying a pie, a selection of a different meeting location, etc.). In an example, the target user 524 may provide the second location of interest message to the user, the second target user 526, and/or the target user group 532.

In an example, the user, the target user 524, and/or the second target user 526 may exchange one or more textual messages, audio messages, etc. corresponding to one or more locations of interest. In an example, the user may send the location of interest message 546 comprising a first textual message (e.g., let's meet at the Steak Restaurant) to the target user 524. The target user 524 may respond with the second location of interest message, corresponding to a second location of interest (e.g., a Fish Restaurant), comprising a second textual message (e.g., how about we meet at the Fish Restaurant?). In an example, the user may send the location of interest message 546 comprising the first textual message and the target user 524 may responds with the second location of interest message comprising the second textual message comprising an agreement, confirmation, etc. to meet at the location of interest proposed by the user. The user and the target user 524 may exchange one or more locations of interest messages comprising one or more textual messages, audio messages, etc. to determine a time, place, etc. to meetup.

Figure 6:
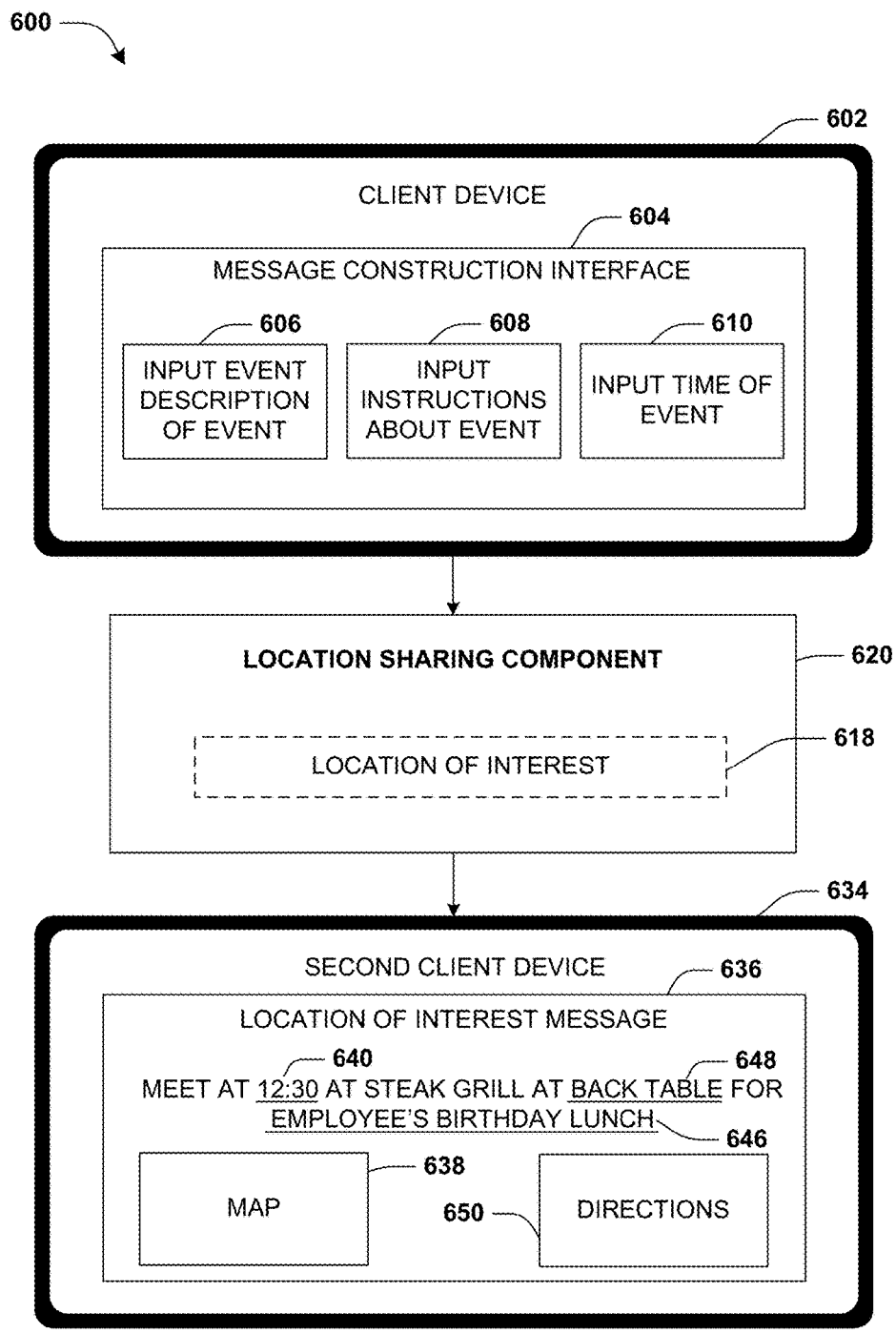
FIG. 6 is a component block diagram illustrating an example system for location sharing, where a location of interest message is constructed.

FIG. 6 illustrates an example of a system 600 comprising a location sharing component 620 configured to generate a message construction interface 604 for constructing a location of interest message 636. A user, on a client device 602, may be presented with the message construction interface 604. The message construction interface 604 may comprise an input event description option 606 for inputting an event (e.g., a birthday party) occurring at a location of interest 618, an input instruction option 608 for inputting instructions about the event (e.g., the location type of the event, such as a restaurant, a street corner, etc.; a dress code of the event; a type of food at the event, etc.), and/or an input event time option 610.

The user may manually input the description, the instructions, and/or the time using the options 606-610. In another example, the description, the instructions, and/or the time may be automatically generated by extracting information from supplemental content, such as an evite, a social network invitation, an appointment on a calendar, etc. For example, if the user has received a birthday evite for an employee's birthday lunch at 12:30 pm, then the location of interest message 636 may be automatically constructed to comprise a time 640 of 12:30 pm and an event description 646 to comprise the employee's birthday lunch. The location sharing component 620 may provide a target user, on a second client device 634, with the location of interest message 636. In an example, the location of interest message 636 may comprise the time 640, instructions 648 about the location (e.g., meeting at a back table), the event description 646, and a location name, such as the Steak Grill. The location of interest message 636 may comprise a map 638 (e.g., the map 638 may depict the Steak Grill, such as where the back table is highlighted), and directions 650 to the Steak Grill.

Figure 7:
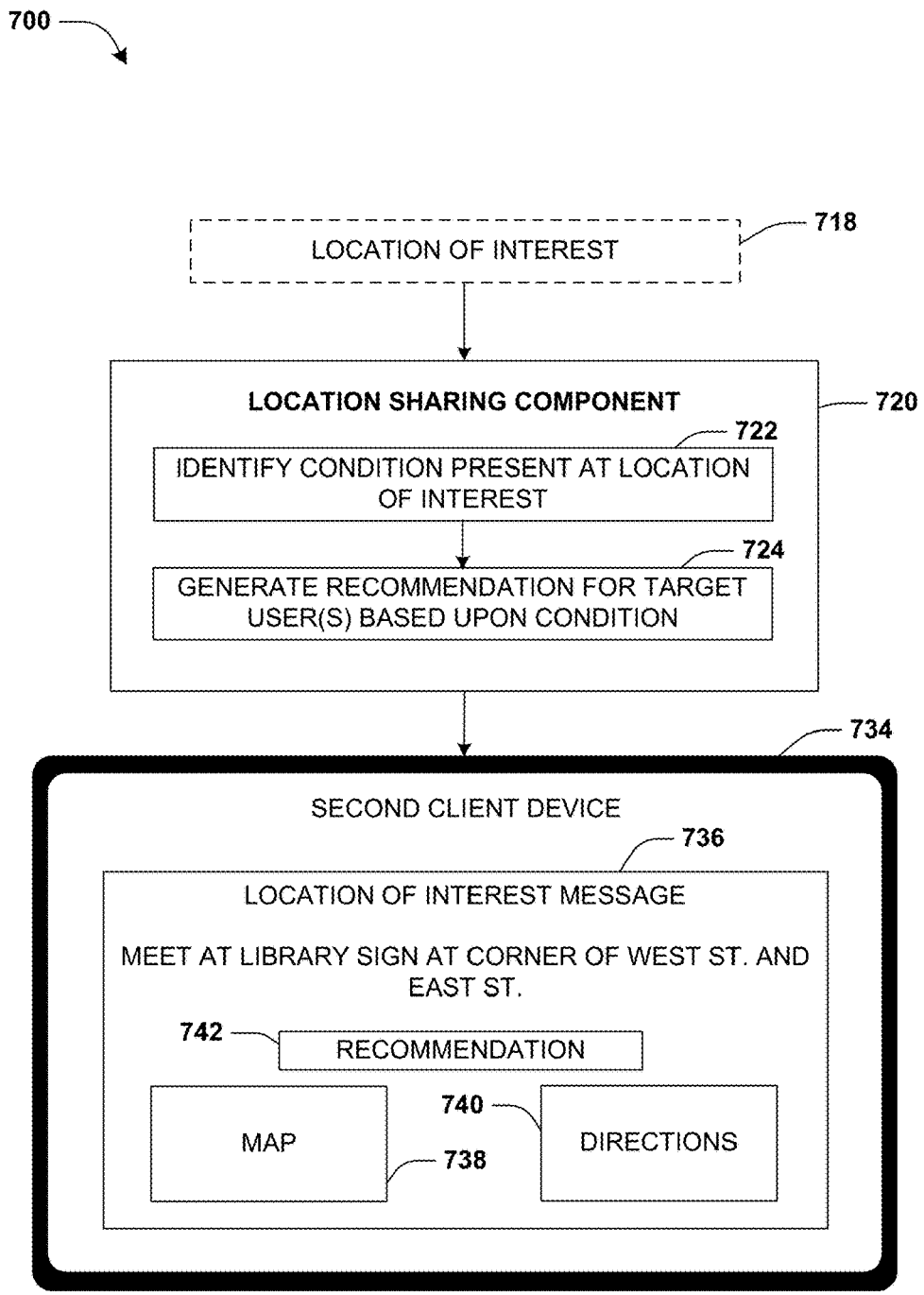
FIG. 7 is a component block diagram illustrating an example system for location sharing, where a recommendation is generated for a target user based upon a condition present at a location of interest.

FIG. 7 illustrates an example of a system 700 comprising a location sharing component 720 configured to identify 722 a condition present at a location of interest 718 and generate 724 a recommendation 742 based upon the condition. Responsive to a user, on a client device 702, identifying the location of interest 718, the location sharing component 720 may identify 722 the condition present at the location of interest 718. In an example, if the condition comprises a high likelihood of rain, the recommendation 742 may comprise an instruction to bring an umbrella. In an example, if the condition comprises a distance that may be too great to walk from a current location of a target user to the location of interest 718 and no free parking, then the recommendation 742 may comprise an instruction to bring quarters for a parking meter and/or cash for a parking garage. The location sharing component 720 may provide a location of interest message 736 to the target user, on a second client device 734. The location of interest message 736 may comprise an instruction to meet at a library sign at a corner of East St. and West St., the recommendation 742, a map 738, and directions 740 to the library sign.

Figure 8:
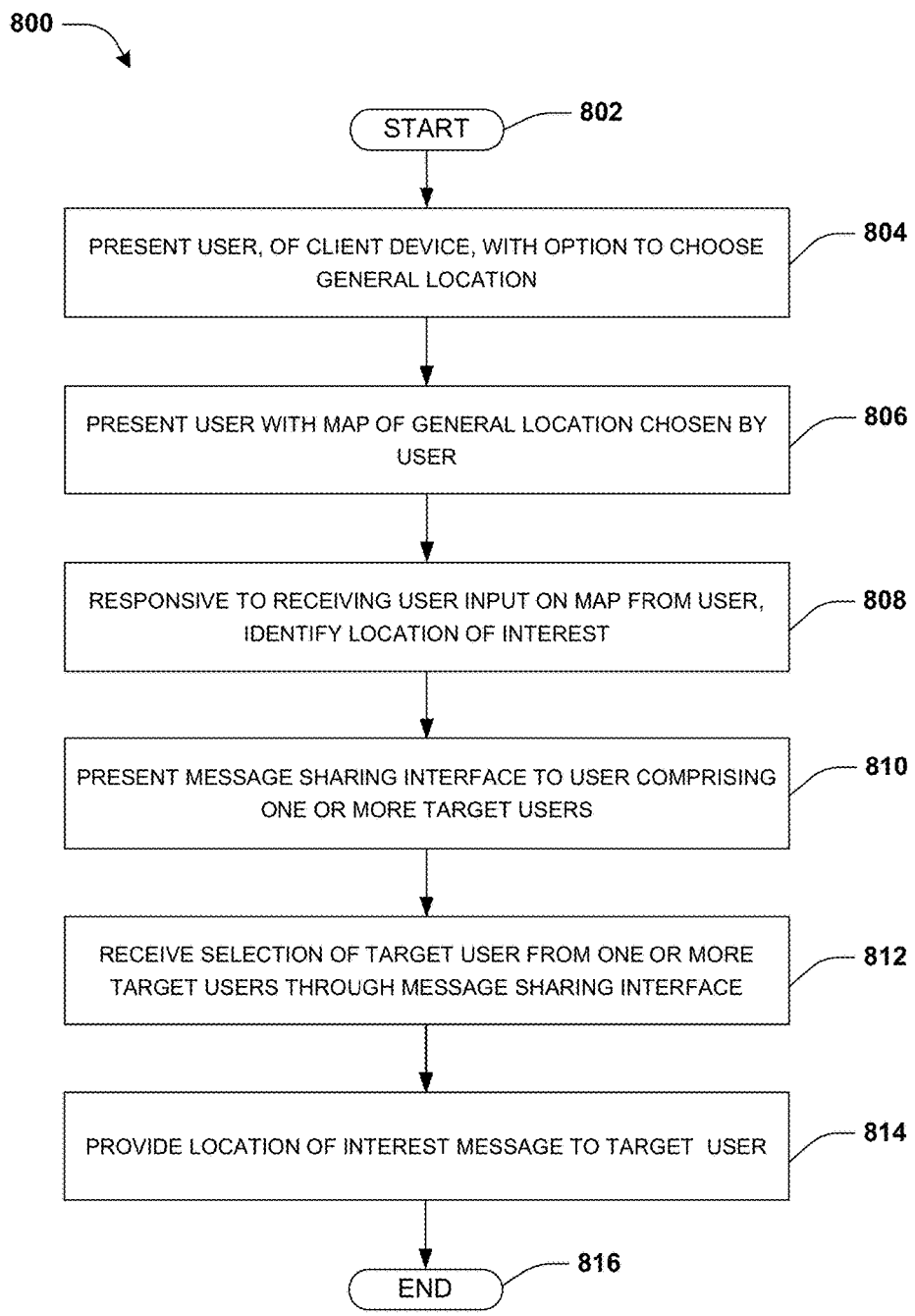
FIG. 8 is a flow chart illustrating an example method of location sharing.

An embodiment of location sharing is illustrated by an example method 800 of FIG. 8. At 802, the method 800 starts. At 804, a user, of a client device, may be presented with an option to choose a general location (e.g., the user may request a map of a Recreation Center). At 806, the user may be presented with a map of the general location chosen by the user (e.g., a Recreation Center map may be populated with depictions of a gymnasium, an art center, a library room, and/or other portions of the Recreation Center). At 808, responsive to receiving a user input on the map, a location of interest may be identified (e.g., the user may select the gymnasium). At 810, a message sharing interface may be presented to the user. The message sharing interface may comprise one or more target users (e.g., the message sharing interface may be populated with a list of social network friends of the user). At 812, a selection of a target user may be received through the message sharing interface (e.g., the user may select Jim from the list of social network friends and may enter an email address for Jack through the message sharing interface). At 814, a location of interest message may be provided to the target user (e.g., an instruction to meet at the gymnasium in 20 minutes may be sent as a social network message to Jim and to the email address of Jack). At 816, the method 800 ends.

Figure 9:
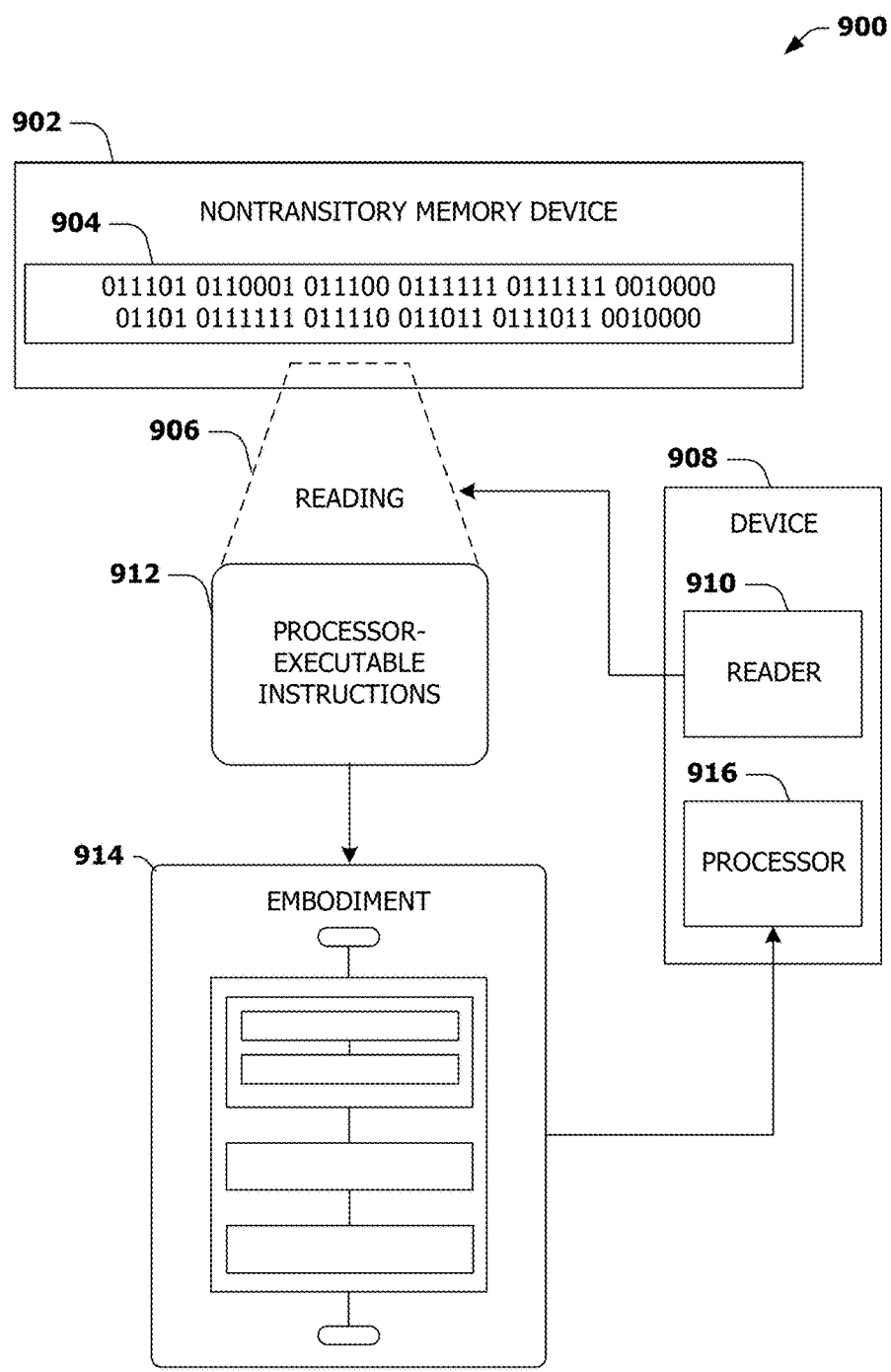
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least some of the example system 400 of FIGS. 4A-4C, at least some of the example system 500 of FIGS. 5A-5B, at least some of the example system 600 of FIG. 6, and/or at least some of the example system 700 of FIG. 7, for example.

Figure 10A:
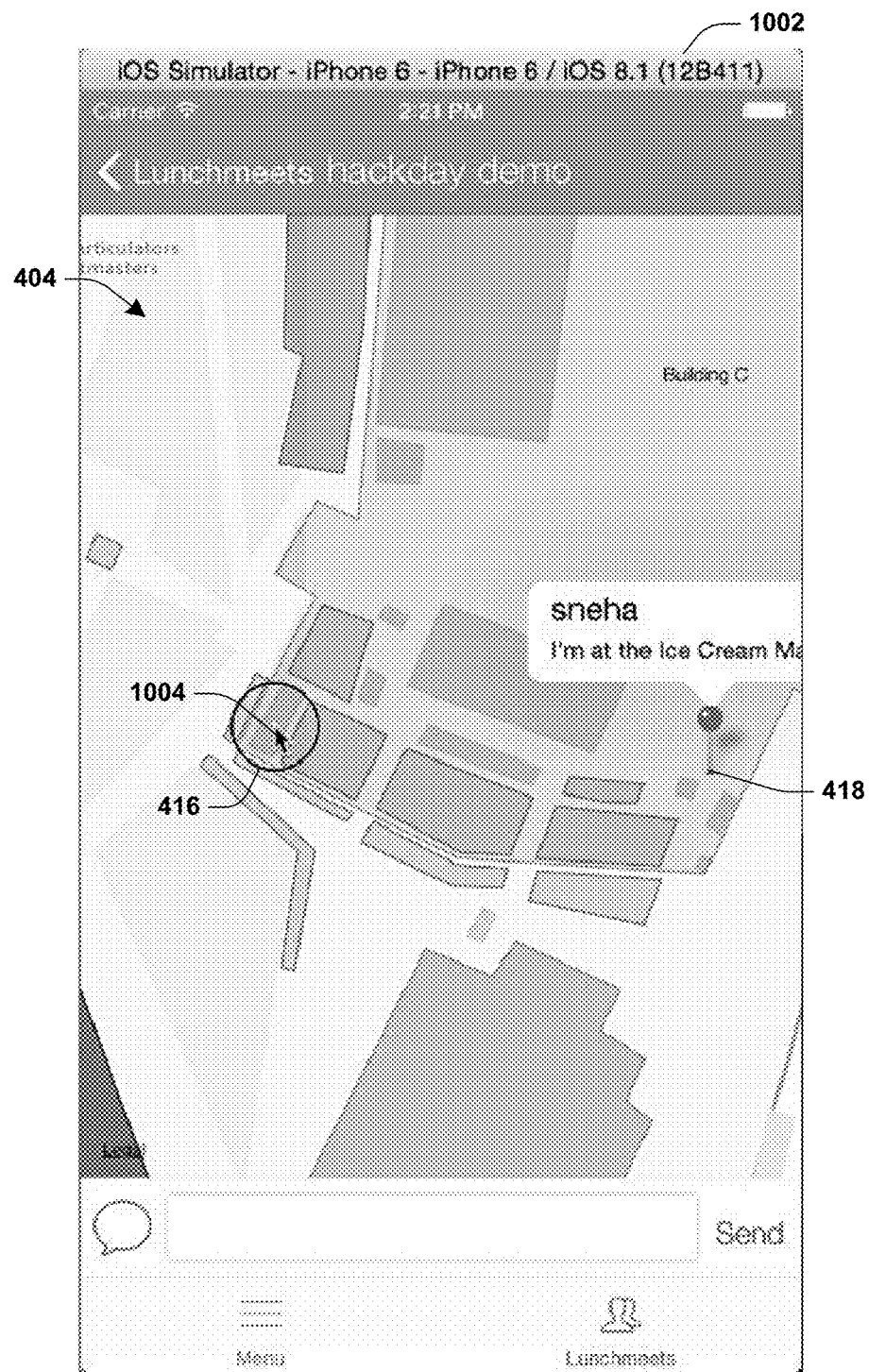
FIG. 10A is an illustration of an example display for location sharing, where a location of interest is shared.
Figure 10B:
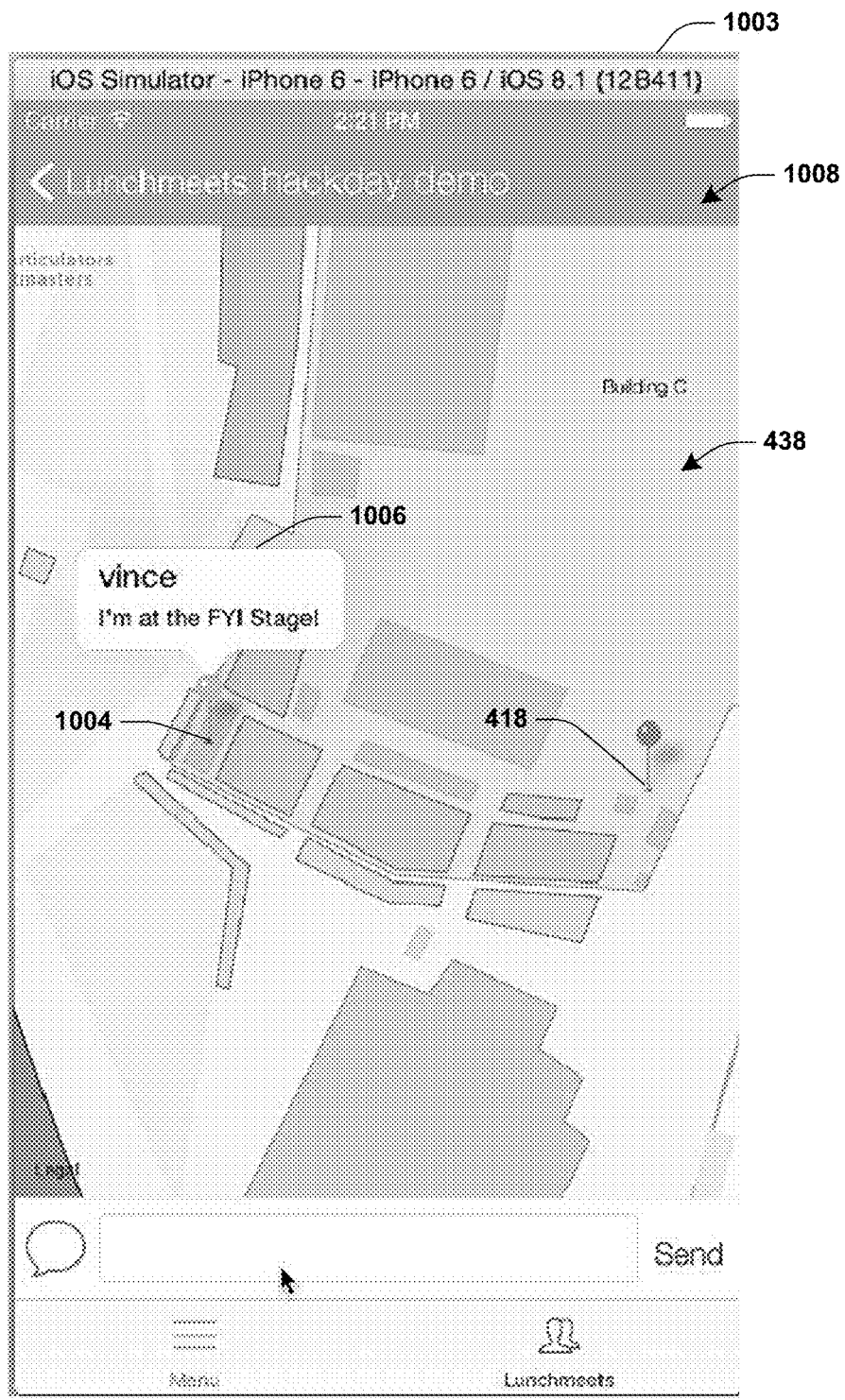
FIG. 10B is an illustration of an example configuration of a second location of interest message provided to a user.

FIGS. 10A-10B illustrate an example of a display for sharing a location of interest 418 of a user (e.g., Sneha), as illustrated in FIG. 4A, with a target user (e.g., Vince). The target user 424, of a client device 1002, may select 416 a second location of interest 1004 by touching, tapping, clicking on, etc. a location on a map interface 404. The map interface 404 may comprise the location of interest 418 received from the user in a location of interest message 436, as illustrated in FIG. 4A.

FIG. 10B illustrates a second location of interest message 1008 composed in a same manner as described above with regards to the location of interest message 436, as illustrated in FIG. 4B. The second location of interest message 1008 may comprise a location of interest map 438 and/or a message 1006 describing the second location of interest 1004. The message 1006 may identify a sender of the second location of interest message 1008. The second location of interest message 1008 may be provided to the user, on a second client device 1003.

Figure 11A:
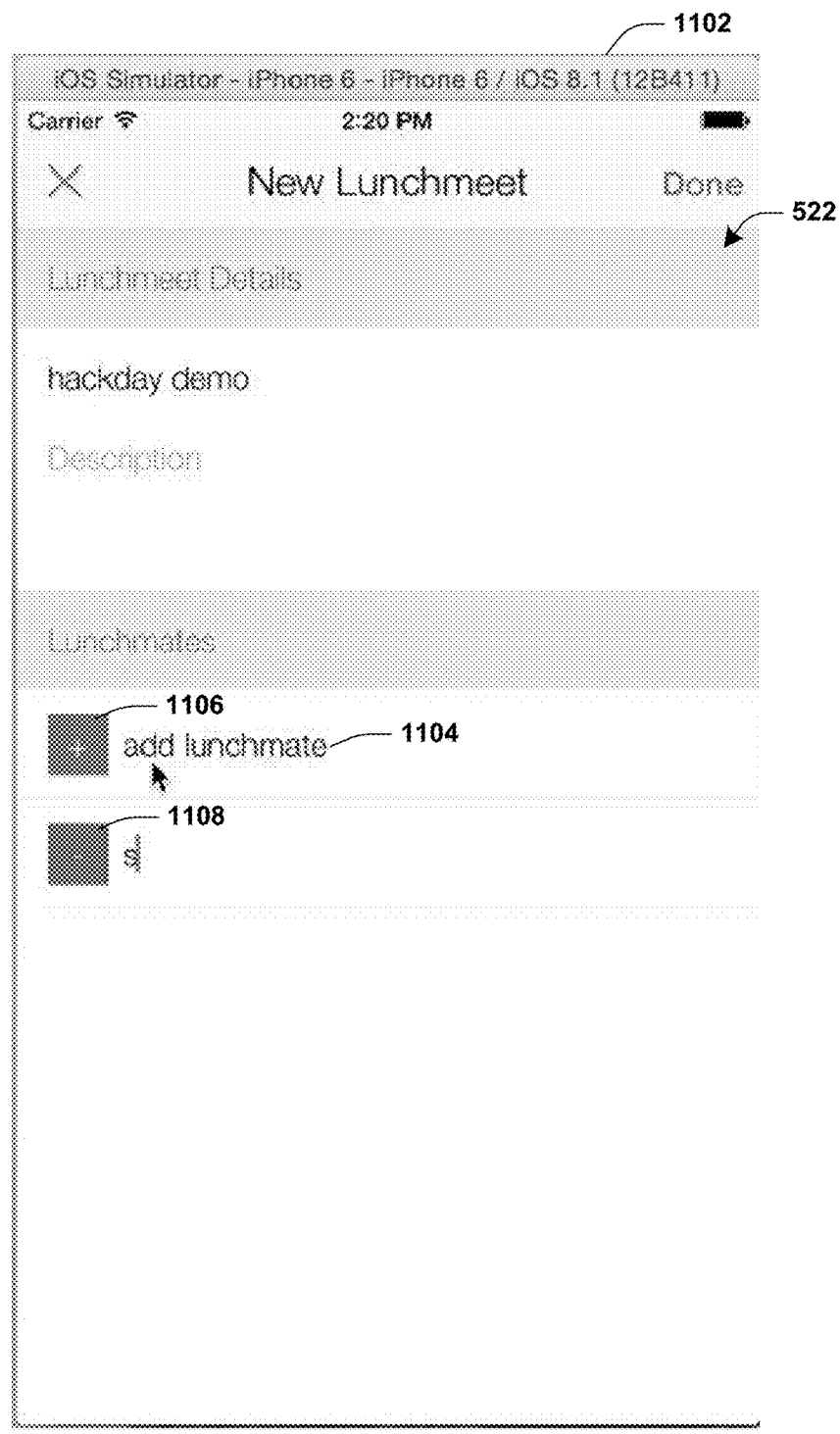
FIG. 11A is an illustration of an example display for location sharing, where a target user is identified.
Figure 11B:
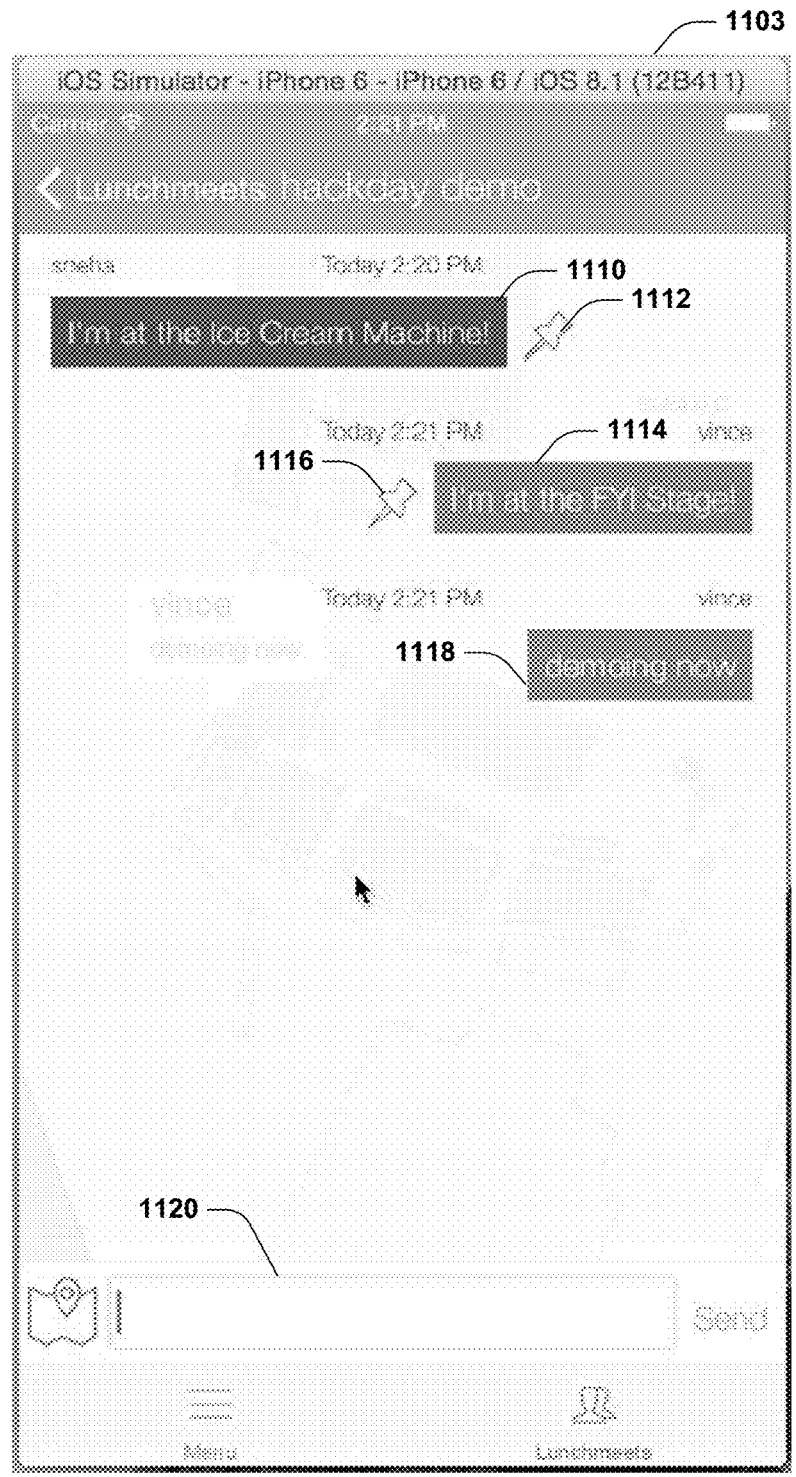
FIG. 11B is an illustration of an example display for location sharing, where a location of interest message is provided to a target user and a second location of interest message is provided to a user.

FIGS. 11A-11B illustrate an example of a message sharing interface 522 for selecting a target user, a second target user, and/or a target user group, in a same manner as described above with regards to the target user 524, the second target user 526, and/or the target user group 532 in FIGS. 5A-5B. In an example, a user, of a client device 1102, may select the target user, the second target user, and/or the target user group to receive a location of interest message 546, as illustrated above in FIG. 5B. In an example, the user may add the target user by selecting an add lunchmate option 1104 (e.g., by selecting a plus sign 1106). In an example, the user may remove the target user by selecting a minus sign 1108.

FIG. 11B illustrates an example of the target user, on a second client device 1103, receiving a location of interest message from the user and responding to the user with a second location of interest message. In an example, the location of interest message and the second location of interest message may be created in a same manner as described above with regards to the location of interest message 546 and the second location of interest message, as illustrated in FIGS. 5A-5B. In an example, a location of interest map, directions to a location of interest, etc. of the location of interest message may be minimized and represented by a first thumbtack icon 1112. A message 1110 (e.g., describing the location of interest) may be displayed near the first thumbtack icon 1112. A second location of interest map, directions to the second location of interest, etc. of the second location of interest message 1116 may be minimized and represented by a second thumbtack icon 1116. A second message 1114 (e.g., describing a second location of interest) may be displayed near the second thumbtack icon 1116. In an example, the target user may generate a third message 1118 by typing the third message 1118 in a text interface 1120.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for location sharing, comprising:
a processor; and
memory comprising processor-executable instructions that when executed by the processor cause implementation of a location sharing component configured to:
   present a user, of a client device, with a map of a general location;
   responsive to receiving a user input on the map, identify a location of interest corresponding to the user input based upon a proximity of the user input to at least one of a landmark or a zone;
   present a message sharing interface to the user, the message sharing interface comprising one or more target users;
   receive a selection of a target user through the message sharing interface;
   generate a location of interest message based upon the proximity of the user input to at least one of the landmark or the zone;
   provide the location of interest message to the target user;
   determine that the user is associated with an online social network group of social network friends;
   generate a predefined target user group based upon the online social network group;
   present the user with an option to select the predefined target user group from amongst two or more predefined target user groups; and
   responsive to the user selecting the predefined target user group, provide the location of interest message to the predefined target user group.

2. The system of claim 1, wherein the general location corresponds to a current location of the user.

3. The system of claim 1, wherein the landmark comprises a lamp post on a street corner.

4. The system of claim 1, the location sharing component further configured to generate the location of interest message based upon at least one of:
an event description of an event; or
instructions about the event.

5. The system of claim 1, the location sharing component further configured to:
construct the location of interest message to comprise an automatically generated description of the location of interest.

6. The system of claim 1, the location sharing component further configured to:
construct the location of interest message to comprise a time of an event.

7. The system of claim 1, the location sharing component further configured to:
identify a condition present at the location of interest; and
generate a recommendation for the target user based upon the condition.

8. The system of claim 1, wherein the zone comprises a section of a library.

9. The system of claim 1, wherein the zone comprises an area of a restaurant.

10. A system for location sharing, comprising:
a processor; and
memory comprising processor-executable instructions that when executed by the processor cause implementation of a location sharing component configured to:
   concurrently present a user with a plurality of options comprising:

a first option corresponding to a map of a current location, a second option corresponding to a map of a future location corresponding to a location that the user is determined to be planning to visit at a later time, and a third option corresponding to a map of a favorite location;

responsive to receiving a selection of one of the plurality of options, populate a map of a general location based upon the selection, the map comprising at least one of a landmark or a zone;

responsive to receiving a user input on the map from the user, identify a location of interest, comprising at least one of the landmark or zone, corresponding to the user input;

present a message sharing interface to the user, the message sharing interface comprising one or more target users;

receive a selection of a target user from the one or more target users through the message sharing interface; and provide a location of interest message to the target user.

11. The system of claim 10, the location sharing component further configured to:

present the user with an option to select a predefined target user group from two or more predefined target user groups; and responsive to the user selecting the predefined target user group, provide the location of interest message to the predefined target user group.

12. The system of claim 10, the location sharing component further configured to:

present the user with an option to create a target user group by selecting a set of target users from the one or more target users.

13. A method, comprising:

presenting a user, of a client device, with a map of a general location;

responsive to receiving a user input on the map, identifying a location of interest corresponding to the user input based upon a proximity of the user input to at least one of a landmark or a zone;

presenting a message sharing interface to the user, the message sharing interface comprising one or more target users;

receiving a selection of a target user through the message sharing interface;

generating a location of interest message based upon the proximity of the user input to at least one of the landmark or the zone;

providing the location of interest message to the target user;

determining that the user is associated with an online social network group of social network friends;

generating a predefined target user group based upon the online social network group;

presenting the user with an option to select the predefined target user group from amongst two or more predefined target user groups; and responsive to the user selecting the predefined target user group, providing the location of interest message to the predefined target user group.

14. The method of claim 13, wherein the general location corresponds to a current location of the user.

15. The method of claim 13, wherein the landmark comprises a lamp post on a street corner.

16. The method of claim 13, wherein generating the location of interest message is based upon at least one of:

an event description of an event; or instructions about the event.

17. The method of claim 13, further comprising:

constructing the location of interest message to comprise an automatically generated description of the location of interest.

18. The method of claim 13, further comprising:

constructing the location of interest message to comprise a time of an event.

19. The method of claim 13, further comprising:

identifying a condition present at the location of interest; and generating a recommendation for the target user based upon the condition.

20. The method of claim 13, wherein the zone comprises a section of a library.

* * * * *